United States Patent [19]
Hartley

[11] 3,807,869
[45] Apr. 30, 1974

[54] SPLIT FIELD LEVELING INSTRUMENT
[75] Inventor: Leonard William Hartley, Bayview, New South Wales, Australia
[73] Assignee: Sulamita Hartley, New South Wales, Australia; a part interest
[22] Filed: Nov. 29, 1972
[21] Appl. No.: 310,454

[30] Foreign Application Priority Data
Dec. 7, 1971  Australia.................................. 7288
May 25, 1972  Australia.................................. 9082

[52] U.S. Cl.................... 356/149, 33/73 D, 356/250
[51] Int. Cl................................................ G01c 1/10
[58] Field of Search ........... 356/250, 144, 149, 148; 350/170, 185, 213, 204; 33/73 D, 73 E

[56] References Cited
UNITED STATES PATENTS
1,531,693  3/1925  Douglass............................ 350/170
3,013,464  12/1961  Keuffel et al........................ 356/250
3,663,111  5/1972  Tsuda et al......................... 356/250

*Primary Examiner*—William L. Sikes

[57] ABSTRACT

A split field surveyor's levelling instrument comprises a casing having an inlet window and an eye-piece which together define a field of vision discernible through the eye-piece. An inverting prism is mounted within the casing to intercept part of the light entering the window and thereby to produce two images in the eye-piece one of which is upright and the other of which is inverted. The prism is mounted on a pendulum support structure weighted so as to keep the base of the prism horizontal notwithstanding fore and aft tilting of the casing.

9 Claims, 7 Drawing Figures

3,807,869

SPLIT FIELD LEVELING INSTRUMENT

This invention relates to levelling instruments of the kind used to establish reference levels. Such instruments are customarily used by builders and construction workers for on-site levelling operations.

Levelling instruments fall into two categories, namely single field and split field instruments.

Single field instruments are basically telescopes fitted with reticules defining a line of sight through the instrument. They are provided with mounting means enabling the instrument to be set accurately horizontal so that in use the telescope may be swung to and fro about a precisely vertical axis.

Thus, single field levelling instruments are precision instruments and therefore costly; also, considerable skill is required to set them up for use.

The field of view of a split field levelling instrument is seen as if divided into halves about an upright center line. The instrument includes two separate optical systems respectively associated with the halves of the field of view. One system produces an inverted image of its field half and the other produces an upright image of its field half. As a result reticules or their equivalent are not required because a target when viewed through the instrument which is off the horizontal line from the instrument is seen in two parts which are displaced vertically. If the actual target is moved so that the portion of its image in the upright field moves towards the portion of its image in inverted field, the apparent space between the image portions decreases and upon the portions becoming coincident, the actual target is horizontal with the instrument's datum point.

Split field instruments are frequently of the so called "automatic" type in which one of the optical elements (referred to hereinafter as the balanced element) of one system is supported and weighted so that is adopts a constant relationship to the horizontal notwithstanding fore-and-aft tilting of the instrument. As a result, the half-field of that system is reduced in scope if the instrument is tilted, but so long as the tilt is not sufficient to eliminate from the field of view the position at which the target image portions coincide, the instrument still operates satisfactorily.

The present invention is directly related to split field automatic levelling instruments.

Hitherto, it has been usual for the balanced element to be a mirror and it has been included in the inverting optical system; the other reflecting surfaces being fixed. As such a system necessarily has an odd number of reflecting surfaces and a single mirror is not suitable, the simplest system has comprised three mirrors. Also, the simplest non-inverting system used hitherto has utilised two mirrors, these also having a fixed angular relationship.

Thus the simplest instrument of the prior art has comprised a casing housing five mirrors (one of which is balanced and free to alter its angular relationship with its fixed mirrors) furnished with a light inlet window and an eye-piece. The five mirrors have to be set very precisely; and thus prior known instruments have been difficult to make and susceptible to damage by mechanical shocks and the like which disturb the positional adjustment of the balanced element with respect to the fixed elements of its optical system.

An object of the present invention is to provide a simple and robust split field "automatic" levelling instrument.

The invention achieves that object by providing an instrument in which the optical system containing the balanced element is wholly mounted on a balanced support structure so that all elements of the system move as one to remain untilted when the instrument case is tilted.

According to preferred embodiments of the invention it is the inverting optical system which is balanced. Also, that system preferably comprises a single inverting prism such as a Dove prism. Also, the non-inverting system is preferably dispensed with in favor of direct vision through the eye-piece of the instrument.

The fact that the entire optical system is balanced (that is to say weighted and mounted so as to remain horizontal) permits the use of systems which allow only one horizontal ray of light to pass through without suffering vertical displacement and which, thus, define a horizontal line of sight corresponding to that ray at all times. This distinguishes instruments according to the invention from prior known automatic split-field levelling instruments in which only one element of the optical system is balanced so that the optical geometry of the system varies with the tilting of the instrument.

The invention consists in a split field levelling instrument comprising a casing having a light inlet opening and an eye-piece which together define a field of vision observable through the instrument and an inverting optical system within the casing intercepting part of the light entering the opening thereby to produce two images in the eye-piece, one of which is upright and the other of which is inverted; characterized in that the whole of said optical system is movable as one, being mounted on a support structure balanced to keep the optical system horizontal notwithstanding fore-and-aft tilting of the casing.

By way of example, several embodiments of the invention are described hereinafter with reference to the accompanying drawings.

Figure 1:
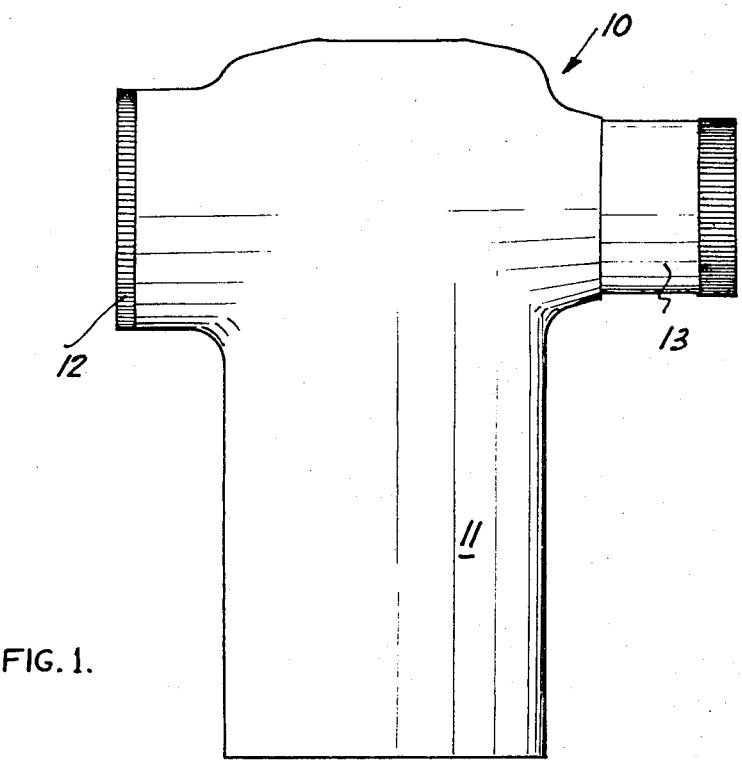
FIG. 1 is a side elevation of an instrument according to the invention.
Figure 2:
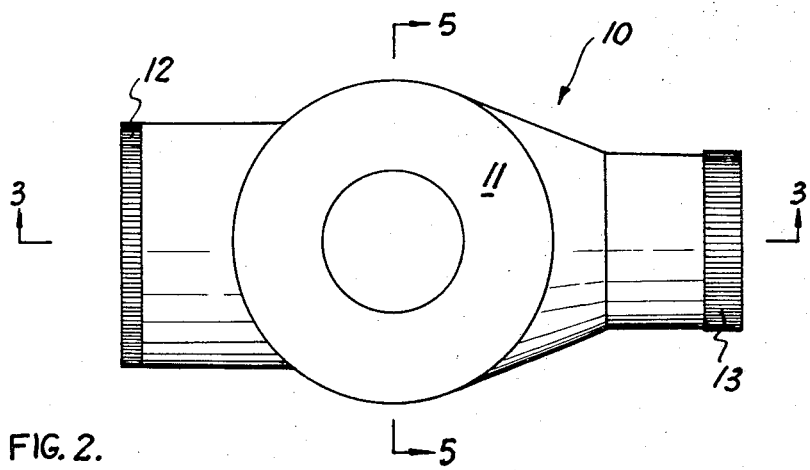
FIG. 2 is a plan view of the instrument of FIG. 1.

The embodiment of the invention illustrated by FIGS. 1 to 5 comprises a casing 10, including a main body portion 11, a window surround 12, an eye-piece 13 and a base 14.

The window surround 12 screws into a spigot on the main body portion 11 and secures a glass pane 15 in position.

The eye-piece 13 is a magnifying eye-piece including not less than two lenses 16 and 17. However, in other embodiments of the invention the eye-piece may be no more than a short tube or peep hole in the casing or other conventional eye-piece serving to limit the field of view through the instrument.

The base 14 is furnished with an annular recess 18 and an internally threaded recess 19 by means of which the instrument as a whole may be set upon a conventional supporting tripod clamp or the like. The base 14 also includes two upright pedestals 20 serving for the support of a balanced inverting optical system.

That optical system comprises an inverting prism such as a dove prism 21 having base angles of for example 45° adhered at the end margins of its base to a pendulum 22.

The pendulum 22 is able to swing in the fore-and-aft direction of the instrument upon a fulcrum pin 23 extending from one supporting sleeve 24 to another supporting sleeve 24 respectively housed in the pedestals 20. The fulcrum pin 23 is considerably smaller in diameter than the inner diameter of a bearing sleeve 25 of low friction material extending through the pendulum 22. This arrangement provides a very low friction pivotal support and at the same time is inexpensive to make and assemble; also such a pivotal arrangement is more durable and less susceptible to damage than more conventional arrangements including knife edges. The pendulum 22 may have a positionally adjustable slug 26 within it so that the rest position of the pendulum may be accurately set to bring the base of the inverting prism 21 into a truly horizontal disposition.

For preference, at least the lower portion of the pendulum 22 is made of metal and a high intensity permanent magnet 27 may be positioned in a pedestal 20 to serve as an eddy current damper for the motion of the pendulum.

Figure 4:
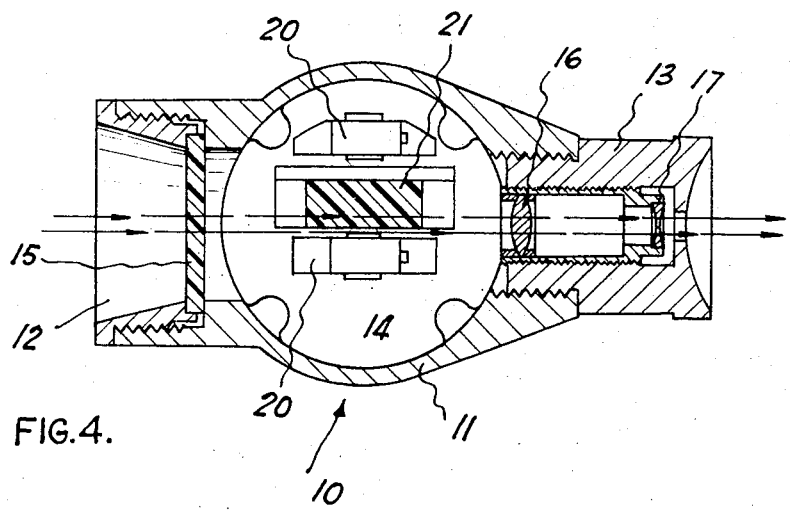
FIG. 4 is a view taken on line 4—4 of FIG. 3.
Figure 5:
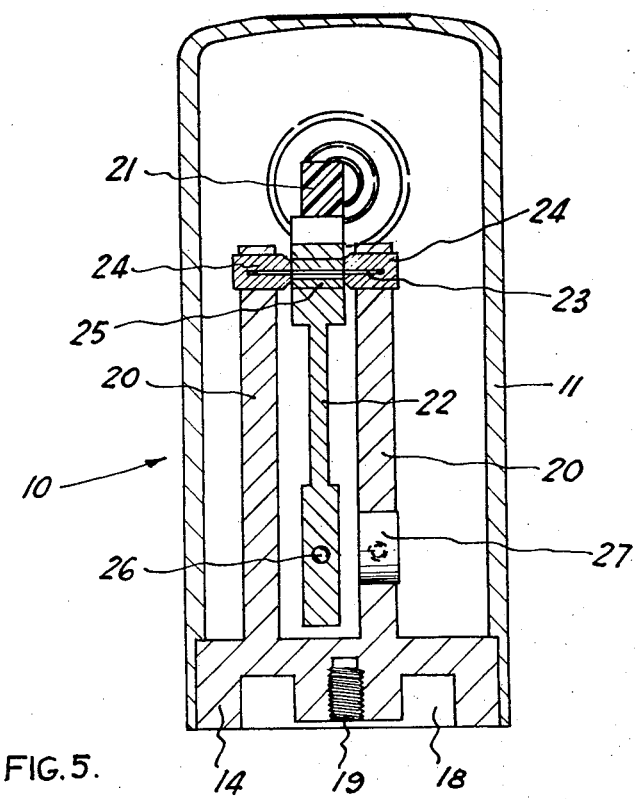
FIG. 5 is a sectional view taken on line 5—5 of FIG. 2.

As can best be seen in FIG. 4, the inverting prism 21 only intercepts one lateral half of the light travelling through the window pane 15 and then through the eye-piece 13.

Figure 3:
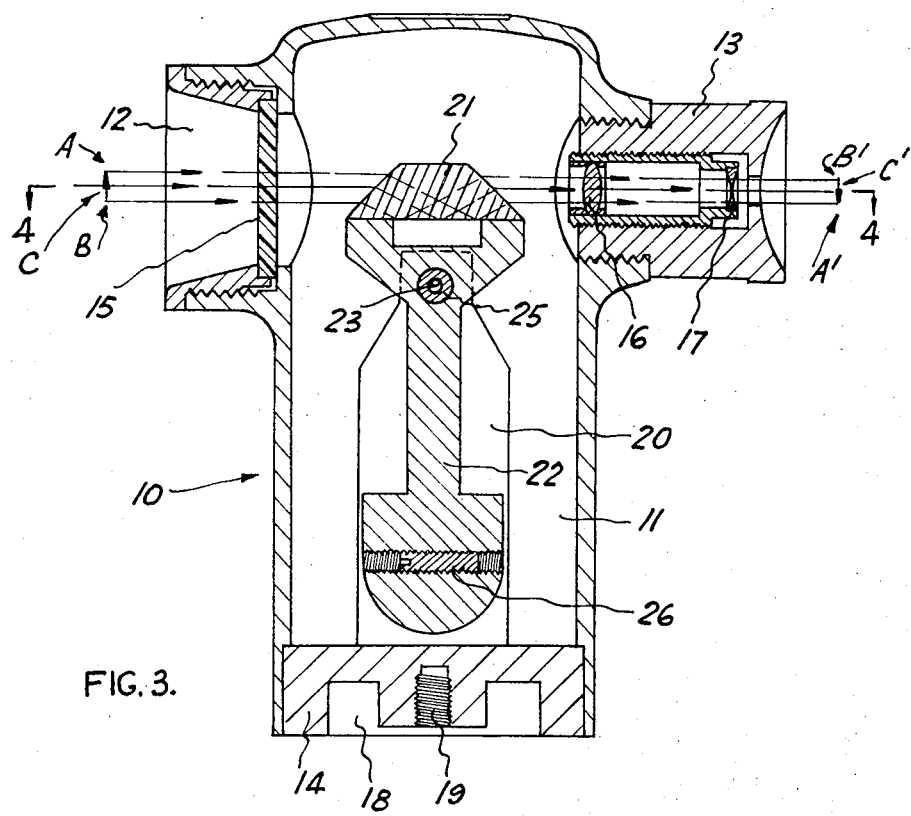
FIG. 3 is a sectional view taken on line 3—3 of FIG. 2.

In the drawings the passage of light through the instrument has been shown conventionally by arrows and it will be noted in particular from FIG. 3 that the image A' B' of a target A B is inverted. Also the horizontal reference ray, that is the ray which does not suffer vertical displacement as it travels through the prism, is indicated as C C'. It is the ray which is reflected from the mid-line of the prism base.

Figure 6:
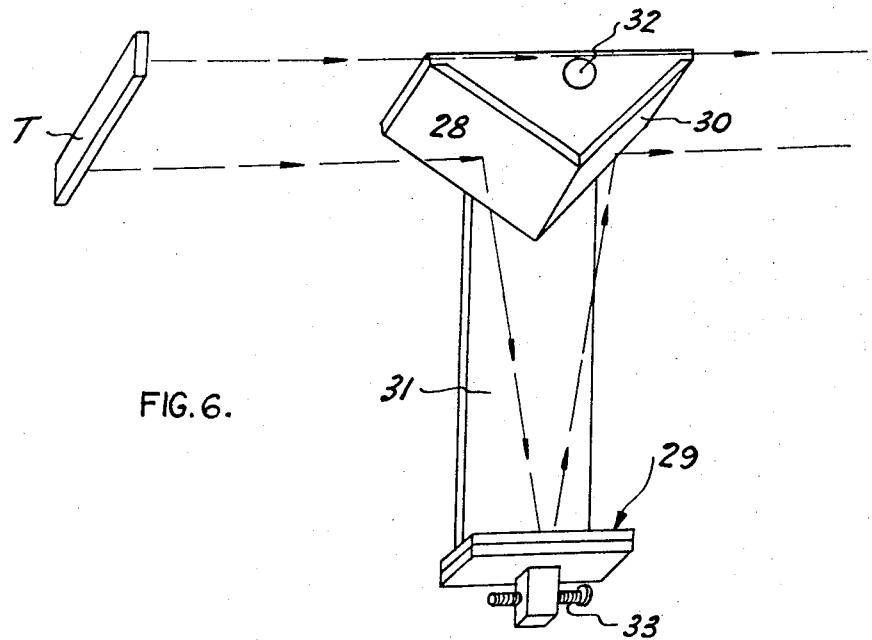
FIG. 6 is a perspective view of the inverting optical system of another embodiment of the invention.

According to the embodiment of the invention illustrated by FIG. 6 the inverting prism 21 and pendulum 22 of the FIG. 1 embodiment of the invention is replaced by three mirrors 28, 29 and 30 mounted upon a pendulum structure 31 having a fulcrum bearing hole 32 and an adjustable balance weight in the form of a screw 33.

It will be seen that the mirrors 28, 30 and 29 are firmly adhered to the pendulum structure which may itself be a single metal piece. Thus, there is little difficulty in manufacture in setting up the three mirrors and they form a robust inverting optical system.

Figure 7:
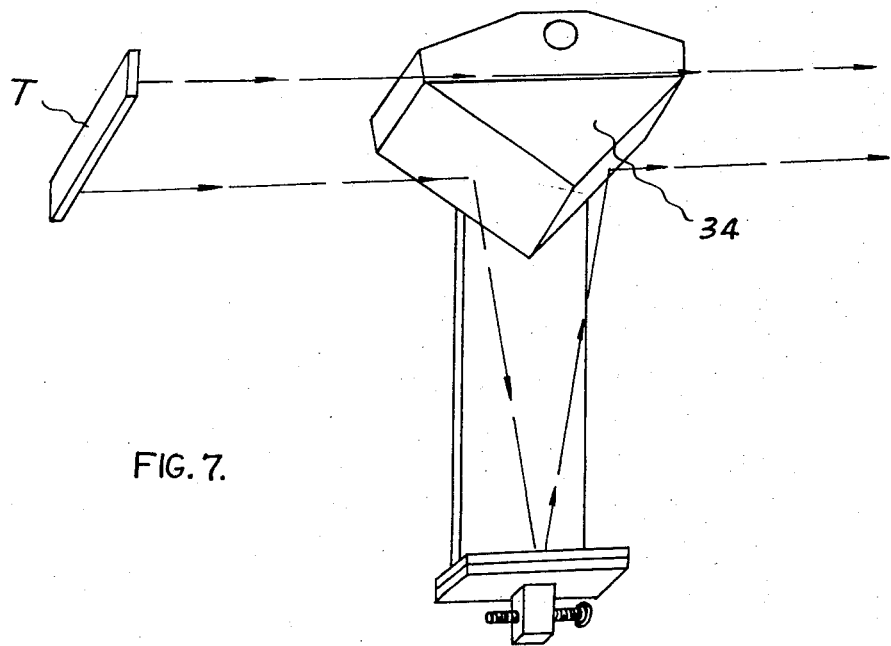
FIG. 7 is a view similar to FIG. 6 of the inverting optical system of a third embodiment of the invention.

The embodiment of the invention illustrated by FIG. 7 is a similar in all respects to that of FIG. 6 except in that the two mirrors 28 and 30 are replaced by a reflecting prism 34.

In FIGS. 6 and 7 a target T is shown and it will be seen that the mirrors 28 and 30 on the one hand or the prism 34 on the other intercept only a lateral half of the light coming from the target.

In other embodiments of the invention a conventional beam splitter may be provided to split the incoming beam of light and direct one half of the beam directly to the eye-piece and the other half to the inverting optical system for subsequent transmission to the eye-piece. The beam splitter may also be positioned between the inverting system and the eye-piece.

If desired the case may be rotatably mounted upon a base engraved or otherwise furnished with a graduated circular scale, such that the direction of vision may be set or re-set as desired. In this event the instrument may include a reticule, for example in the eye-piece, to facilitate aiming the instrument at a remote target, thereby to facilitate the measuring or setting of angles in the horizontal plane by use of the graduated base.

For preference means are provided to clamp the optical system support structure against movement for protection of the instrument when out of use, for example during transport thereof.

I claim:

1. A split field leveling instrument comprising a casing having a light inlet opening and an eye-piece which together enable a field of vision to be observed through the instrument; and inverting optical system within the casing intercepting part of the light entering the opening and inverting a side portion of the field of view as observed through the eye-piece; means mounting the inverting optical system so that it is movable as one, said means having a pendulum pivotally supported for swinging about an axis extending tranversely of the instrument such that the optical system remains horizontal, notwithstanding fore-and-aft tilting of the casing.

2. A split field leveling instrument according to claim 1 wherein said optical system is an inverting prism which inverts but does not laterally rotate a light beam passing through it.

3. An instrument according to claim 1 wherein said pendulum is pivotally mounted upon a fulcrum pin extending transversely of the instrument through a hole in the pendulum of which the diameter is substantially greater than the diameter of said pin.

4. An instrument according to claim 1 wherein the balanced of said pendulum is adjustable by means of a movable balanced weight associated with it.

5. An instrument according to claim 1 wherein said eye-piece is a magnifying eye-piece.

6. An instrument according to claim 1 including damping means for damping oscillation of said pendulum.

7. An instrument according to claim 1 including a beam splitter in the light path separating the inverted portion of the field of view from the upright portion.

8. An instrument according to claim 1 having a graduated based upon which the casing is rotatably mounted and a datum point indicator fixed relative to the casing.

9. An instrument according to claim 1 including means to clamp the pendulum supporting structure against movement relative to the casing.

* * * * *